(12) United States Patent
Stephens et al.

(10) Patent No.: US 6,347,478 B1
(45) Date of Patent: Feb. 19, 2002

(54) FISHING DEVICE

(76) Inventors: Jerry W. Stephens; Virginia F. Stephens, both of P.O.Box #38, Gould, OK (US) 73544

( * ) Notice: Subject to any disclaimer, the term of this patent is extended or adjusted under 35 U.S.C. 154(b) by 0 days.

(21) Appl. No.: 09/488,985

(22) Filed: Jan. 21, 2000

(51) Int. Cl.[7] .............................................. A01K 91/00
(52) U.S. Cl. ..................... 43/43.1; 43/43.22; 43/43.14
(58) Field of Search ........................ 43/19.2, 20, 26.1, 43/27.4, 34–37, 43.1–43.15, 44.92, 44.87, 44.96, 44.97, 57.3; 441/22–29

(56) References Cited

U.S. PATENT DOCUMENTS

| | | |
|---|---|---|
| 3,974,590 A | * 8/1976 | Boone ........................ 43/43.14 |
| 4,443,203 A | 4/1984 | Maertens |
| 4,561,205 A | 12/1985 | Kessler |
| 4,607,449 A | 8/1986 | Brachear |
| D291,905 S | 9/1987 | Brachear |
| 4,845,885 A | * 7/1989 | Rubbelke ................... 43/44.95 |
| 5,207,013 A | 5/1993 | Bartok et al. |
| 5,265,369 A | 11/1993 | Botkins |

* cited by examiner

*Primary Examiner*—Peter M. Poon
*Assistant Examiner*—Floris C Copier

(57) ABSTRACT

A fishing device for fishing without the need for a fishing pole and fishing reel. The fishing device includes a housing, which is elongate and has a first end, a second end and a peripheral wall extending therebetween. The housing is generally hollow. The second end is open. A covering member covers the second end of the housing. An arm for holding a fishing line has a distal portion and proximal portion. The distal portion is inserted through a bore formed in the covering member. The proximal portion forms a ring.

7 Claims, 2 Drawing Sheets

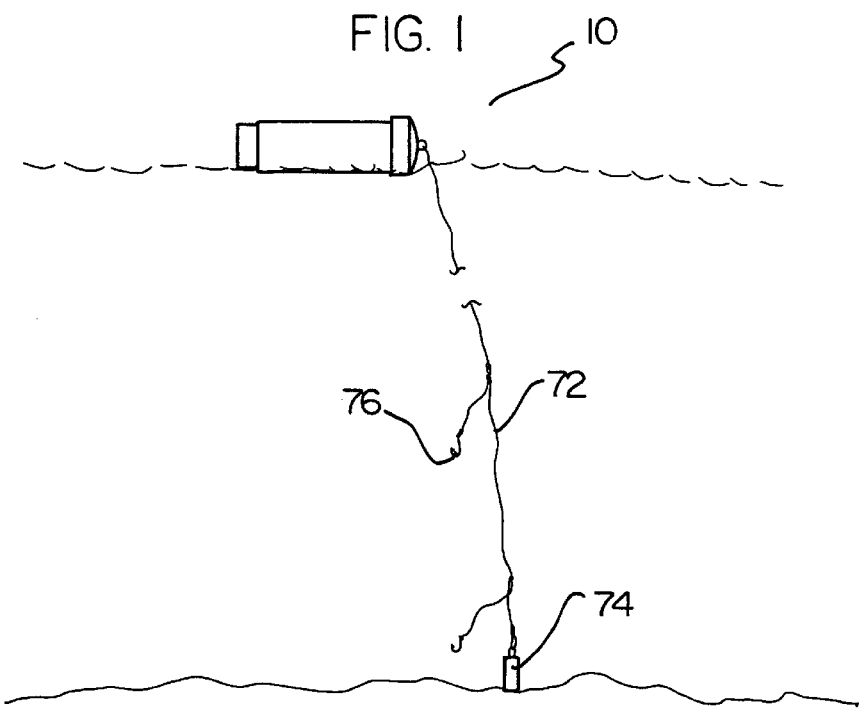
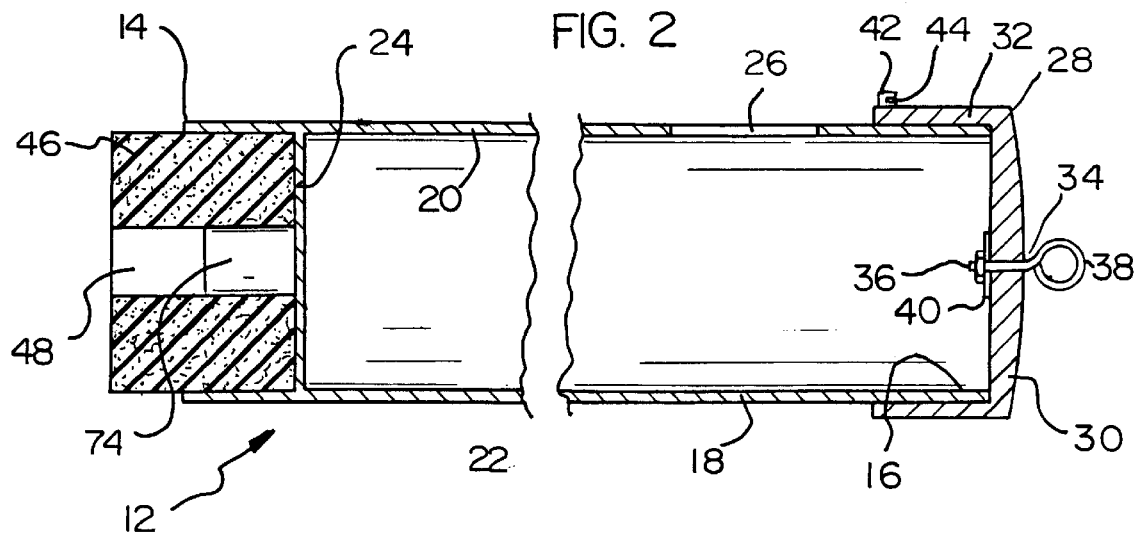

FISHING DEVICE

BACKGROUND OF THE INVENTION

1. Field of the Invention

The present invention relates to fishing apparatuses and more particularly pertains to a new fishing device for fishing without the need for a fishing pole and fishing reel.

2. Description of the Prior Art

The use of fishing apparatuses is known in the prior art. More specifically, fishing apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,443,203; U.S. Pat. No. 4,607,449; U.S. Pat. No. 5,265,369; U.S. Pat. No. 5,207,013; U.S. Pat. No. 4,561,205; and U.S. Pat. No. 291,905.

While these devices fulfill their respective, particular objectives and requirements, the aforementioned patents do not disclose a new fishing device. The inventive device includes a housing, which is elongate and has a first end, a second end and a peripheral wall extending therebetween. The housing is generally hollow. The second end is open. A covering member covers the second end of the housing. An arm for holding a fishing line has a distal portion and proximal portion. The distal portion is inserted through a bore the covering member. The proximal portion forming a ring.

In these respects, the fishing device according to the present invention substantially departs from the conventional concepts and designs of the prior art, and in so doing provides an apparatus primarily developed for the purpose of fishing without the need for a fishing pole and fishing reel.

SUMMARY OF THE INVENTION

In view of the foregoing disadvantages inherent in the known types of fishing apparatuses now present in the prior art, the present invention provides a new fishing device construction wherein the same can be utilized for fishing without the need for a fishing pole and fishing reel.

The general purpose of the present invention, which will be described subsequently in greater detail, is to provide a new fishing device apparatus and method which has many of the advantages of the fishing apparatuses mentioned heretofore and many novel features that result in a new fishing device which is not anticipated, rendered obvious, suggested, or even implied by any of the prior art fishing apparatuses, either alone or in any combination thereof.

To attain this, the present invention generally comprises a housing, which is elongate and has a first end, a second end and a peripheral wall extending therebetween. The housing is generally hollow. The second end is open. A covering member covers the second end of the housing. An arm for holding a fishing line has a distal portion and proximal portion. The distal portion is inserted through a bore the covering member. The proximal portion forming a ring.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing device apparatus and method which has many of the advantages of the fishing apparatuses mentioned heretofore and many novel features that result in a new fishing device which is not anticipated, rendered obvious, suggested, or even implied by any of the prior art fishing apparatuses, either alone or in any combination thereof.

It is another object of the present invention to provide a new fishing device which may be easily and efficiently manufactured and marketed.

It is a further object of the present invention to provide a new fishing device which is of a durable and reliable construction.

An even further object of the present invention is to provide a new fishing device which is susceptible of a low cost of manufacture with regard to both materials and labor, and which accordingly is then susceptible of low prices of sale to the consuming public, thereby making such fishing device economically available to the buying public.

Still yet another object of the present invention is to provide a new fishing device which provides in the apparatuses and methods of the prior art some of the advantages thereof, while simultaneously overcoming some of the disadvantages normally associated therewith.

Still another object of the present invention is to provide a new fishing device for fishing without the need for a fishing pole and fishing reel.

Yet another object of the present invention is to provide a new fishing device which includes a housing, which is elongate and has a first end, a second end and a peripheral wall extending therebetween. The housing is generally hollow. The second end is open. A covering member covers the second end of the housing. An arm for holding a fishing line has a distal portion and proximal portion. The distal portion is inserted through a bore the covering member. The proximal portion forming a ring.

Still yet another object of the present invention is to provide a new fishing device that allows the fisherman to leave the line unattended.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new fishing device according to the present invention.

FIG. 2 is a schematic cross-sectional view of the present invention.

DESCRIPTION OF THE PREFERRED EMBODIMENT

Figure 3:
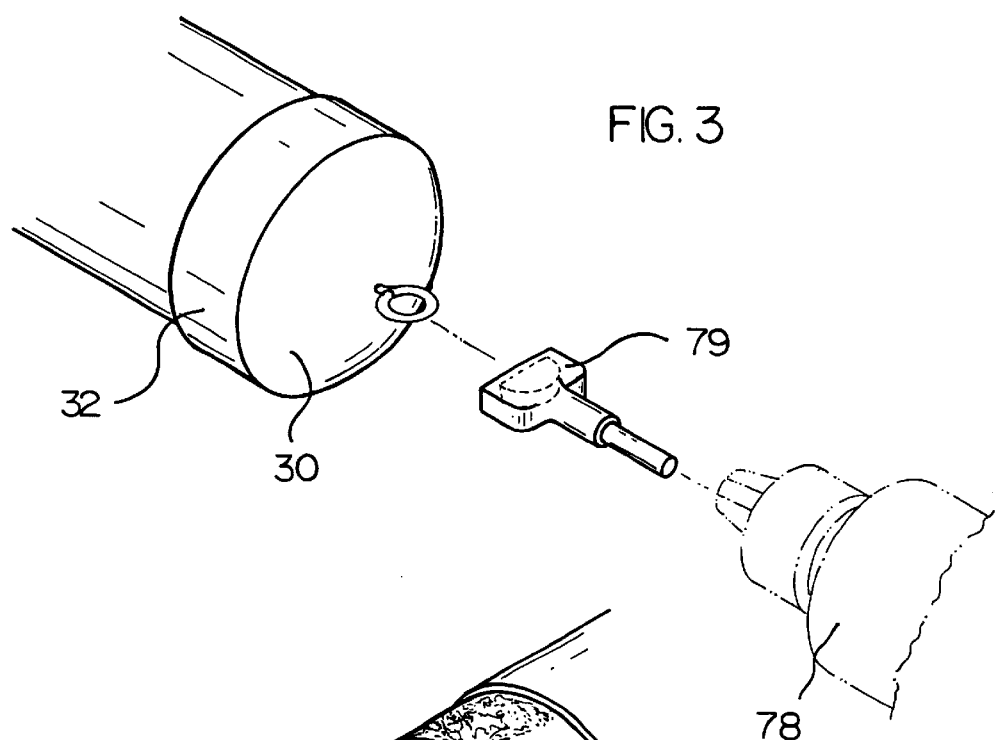
FIG. 3 is a schematic perspective view of the present invention.
Figure 4:
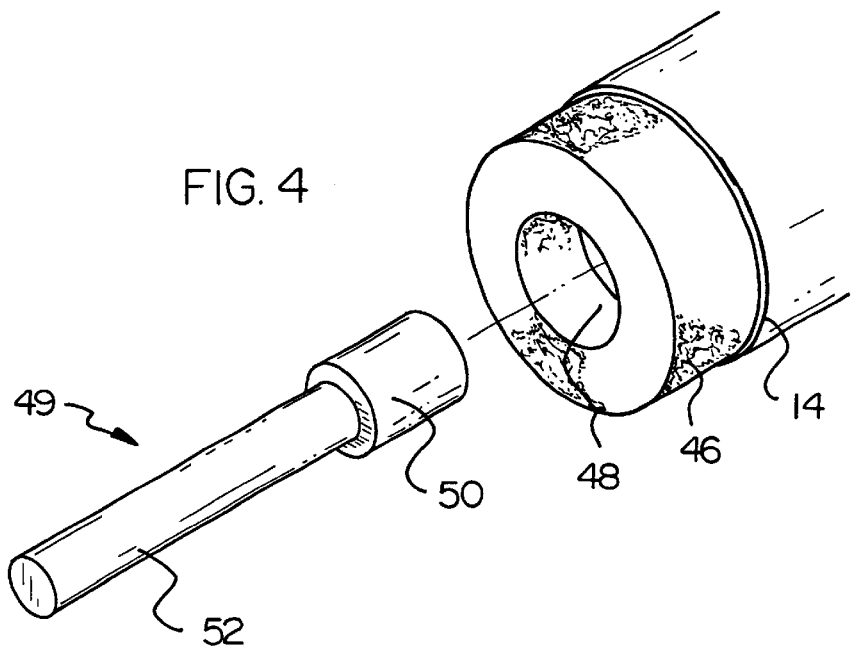
FIG. 4 is a schematic perspective view of the present invention.

With reference now to the drawings, and in particular to FIGS. 1 through 4 thereof, a new fishing device embodying the principles and concepts of the present invention and generally designated by the reference numeral 10 will be described.

As best illustrated in FIGS. 1 through 4, the fishing device 10 generally comprises a housing 12. The housing is elongate and has a first end 14, a second end 16 and a peripheral wall 18 extending therebetween. The housing 12 is generally hollow. The first 14 and second ends 16 are open. The housing 12 has an interior surface 20 and exterior surface 22. The housing 12 has an internal wall 24, which is integrally coupled to the interior surface 20 of the peripheral wall 18. The internal wall 24 is located generally adjacent to the first end 14 of the housing 12 and is oriented generally perpendicular to a longitudinal axis of the housing 12. The peripheral wall 18 has an elongate aperture 26 therein. The housing 12 preferably has a generally circular shaped cross-section taken transverse to the longitudinal axis of the housing. The housing is ideally made of a plastic.

A covering member 28 covers the second end 16 of the housing 12. The covering member 28 has a wall 30, which has a peripheral edge. A lip 32 is fixedly coupled to the wall 30. The lip 32 extends away from the wall 30 and has a shape adapted to fit about the exterior surface 22 of the housing 12. The lip 32 is fixedly coupled to the peripheral wall 18 of the housing 12. The covering member 28 is a cap and is preferably made from a plastic.

An arm 34 holds the fishing line 72. The arm 34 has a distal portion 36 and proximal portion 38. The distal portion 36 is inserted through a bore in a central area of the wall 30 of the covering member 28. The distal portion 36 is inserted through a washer 40. The washer 40 is between an interior of the housing 12 the covering member 28. The washer 40 is fixedly coupled to the covering member 28. The distal portion 36 is fixedly coupled to the covering member 28. The proximal portion 38 extends and forms a ring.

A protruding member 42 for grasping the fishing line when the line is retrieved is integrally coupled to the lip 32 of the covering member 28. The protruding member 42 defines a notch 44, wherein a portion of a length of the fishing line 72 may be placed in the notch 44.

A plug portion 46 holds a fishing line weight 74. The plug 46 is inserted in the first end 14 of the housing 12. The plug 46 has a bore 48 therein and has an axis is generally coaxial with the longitudinal axis of the housing 12. The plug portion 46 is made from a foamed elastomeric material.

A handle portion 49 is a rod having a first section 50 and a second section 52. The first section 50 has a diameter generally larger than the second section 52. The first section 50 has a size adapted to fit in the bore 48 of the plug 46. The handle portion 49 has a generally cylindrical shape.

In use, line 72 is wound about the housing 12. The line 72 has hooks 76 attached to it which can be stuck into the plug portion 46 during storage. The line has a weight 74 attached to it, which is stored in the bore 48 of the plug 46. The hooks 76 are baited and the line 72 is let loose. The aperture 26 allows the housing 12 to fill with water. When a fish strikes the line, the plug portion 46 will stand up due to the foamed material therein. The fisher then places the handle portion 49 in the bore 48 and uses an power rotary tool 78 with an attachment 79 adapted to couple to the arm 34 to rotate the housing 12 and bring the line 72 up. The housing 12 rotates with respect to the handle 49, which the user keeps in their hand while the other hand operates the rotary tool 78.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fishing device, said device comprising:

a housing, said housing being elongate, said housing having a first end, a second end and a peripheral wall extending therebetween, said housing being generally hollow, said second end being open;

a covering member for said second end of said housing;

an arm for holding a fishing line, said arm having a distal portion and proximal portion, said distal portion being inserted through a bore formed in said covering member, said proximal portion forming a ring;

said covering member having a wall, said wall having a peripheral edge, a lip being fixedly coupled to said wall, said lip extending away from said wall, said lip having a shape adapted to fit about said exterior surface of said housing, said lip being fixedly coupled to said peripheral wall of said housing;

said first and second ends being open, said housing having an interior surface and exterior surface, said housing having an internal wall, said internal wall being integrally coupled to said interior surface of said wall, said internal wall being located generally adjacent to said first end of said housing, said internal wall being oriented generally perpendicular to a longitudinal axis of said housing; and a protruding member for grasping the fishing line and holding the line when it is being retracted, said protruding member being integrally coupled to said lip of said covering member, said protruding member defining a notch, wherein a portion of a length of the fishing line may be placed in said notch.

2. The fishing device as in claim 1, wherein said housing further comprises:

said peripheral wall of said housing having an elongate aperture therein; and a plug portion for holding a fishing line weight, said plug being inserted in said first end of said housing, said plug having a bore therein, said bore having an axis being generally coaxial with a longitudinal axis of said housing, said plug portion being made from a foamed elastomeric material.

3. The fishing device as in claim 1, wherein said arm comprises:

said distal portion being inserted through a bore in a central area of said wall of said covering member, said distal portion being inserted through a washer, said washer being between an interior of said housing said covering member, said washer being fixedly coupled to said covering member, said distal portion being fixedly coupled to said covering member, said proximal portion extending away from said housing.

4. The fishing device as in claim 2, further comprising:

a handle portion, said handle portion being a rod, said rod having a first section and a second section, said first section having a diameter generally larger than said second section, said first section having a size adapted to fit in said bore of said plug, said handle portion having a generally cylindrical shape.

5. The fishing device of claim 1, further comprising a winding attachment having a cup portion for receiving said arm and a bit portion for removably inserting in a rotary tool for winding said fishing line about said housing.

6. A fishing device, said device comprising:

a housing, said housing being elongate, said housing having a first end, a second end and a peripheral wall extending therebetween, said housing being generally hollow, said first and second ends being open, said housing having an interior surface and exterior surface, said housing having an internal wall, said internal wall being integrally coupled to said interior surface of said wall, said internal wall being located generally adjacent to said first end of said housing, said internal wall being oriented generally perpendicular to a longitudinal axis of said housing, said peripheral wall having an elongate aperture therein, said housing having a generally circular shaped cross-section taken transverse to said longitudinal axis of said housing, said housing being made of a plastic;

a covering member for said second end of said housing, said covering member having a wall, said wall having a peripheral edge, a lip being fixedly coupled to said wall, said lip extending away from said wall, said lip having a shape adapted to fit about said exterior surface of said housing, said lip being fixedly coupled to said peripheral wall of said housing, said covering member being a cap, said covering member being made from a plastic;

an arm for holding a fishing line, said arm having a distal portion and proximal portion, said distal portion being inserted through a bore in a central area of said wall of said covering member, said distal portion being inserted through a washer, said washer being between an interior of said housing said covering member, said washer being fixedly coupled to said covering member, said distal portion being fixedly coupled to said covering member, said proximal portion extending away from said housing, said proximal portion forming a ring;

a protruding member for grasping the fishing line, said protruding member being integrally coupled to said lip of said covering member, said protruding member defining a notch, wherein a portion of a length of the fishing line may be placed in said notch;

a plug portion for holding a fishing line weight, said plug being inserted in said first end of said housing, said plug having a bore therein, said bore having an axis being generally coaxial with said longitudinal axis of said housing, said plug portion being made from a foamed elastomeric material; and a handle portion, said handle portion being a rod, said rod having a first section and a second section, said first section having a diameter generally larger than said second section, said first section having a size adapted to fit in said bore of said plug, said handle portion having a generally cylindrical shape; and a winding attachment having a cup portion for receiving said arm and a bit portion for removably inserting in a drill for winding said fishing line about said housing.

7. A fishing device for winding fishing line with a rotary tool such as a cordless power drill, said combination comprising:

a rotary tool for winding a fishing line;

a housing, said housing being elongate, said housing having a first end, a second end and a peripheral wall extending therebetween, said housing being generally hollow, said first and second ends being open, said housing having an interior surface and exterior surface, said housing having an internal wall, said internal wall being integrally coupled to said interior surface of said wall, said internal wall being located generally adjacent to said first end of said housing, said internal wall being oriented generally perpendicular to a longitudinal axis of said housing, said peripheral wall having an elongate aperture therein, said housing having a generally circular shaped cross-section taken transverse to said longitudinal axis of said housing, said housing being made of a plastic;

a covering member for said second end of said housing, said covering member having a wall, said wall having a peripheral edge, a lip being fixedly coupled to said wall, said lip extending away from said wall, said lip having a shape adapted to fit about said exterior surface of said housing, said lip being fixedly coupled to said peripheral wall of said housing, said covering member being a cap, said covering member being made from a plastic;

an arm for holding the fishing line, said arm having a distal portion and proximal portion, said distal portion being inserted through a bore in a central area of said wall of said covering member, said distal portion being inserted through a washer, said washer being between an interior of said housing said covering member, said washer being fixedly coupled to said covering member, said distal portion being fixedly coupled to said covering member, said proximal portion extending away from said housing, said proximal portion forming a ring;

a protruding member for grasping the fishing line, said protruding member being integrally coupled to said lip of said covering member, said protruding member defining a notch, wherein a portion of a length of the fishing line may be placed in said notch;

a plug portion for holding a fishing line weight, said plug being inserted in said first end of said housing, said plug having a bore therein, said bore having an axis being generally coaxial with said longitudinal axis of said housing, said plug portion being made from a foamed elastomeric material; and a handle portion, said handle portion being a rod, said rod having a first section and a second section, said first section having a diameter generally larger than said second section, said first section having a size adapted to fit in said bore of said plug, said handle portion having a generally cylindrical shape; and a winding attachment having a cup portion for receiving said arm and a bit portion for removably inserting in said rotary tool for winding said fishing line about said housing.

\* \* \* \* \*